United States Patent
Zhang et al.

(10) Patent No.: US 10,104,603 B2
(45) Date of Patent: Oct. 16, 2018

(54) APPARATUS, SYSTEM AND METHOD FOR DEDICATED CORE NETWORK

(71) Applicant: NEC Corporation, Tokyo (JP)

(72) Inventors: Xiaowei Zhang, Tokyo (JP); Toshiyuki Tamura, Tokyo (JP); Anand Raghawa Prasad, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/314,815

(22) PCT Filed: May 26, 2015

(86) PCT No.: PCT/JP2015/002635
§ 371 (c)(1),
(2) Date: Nov. 29, 2016

(87) PCT Pub. No.: WO2015/182111
PCT Pub. Date: Dec. 3, 2015

(65) Prior Publication Data
US 2017/0201937 A1    Jul. 13, 2017

(30) Foreign Application Priority Data

May 30, 2014  (JP) .................................. 2014-112269

(51) Int. Cl.
*H04W 4/00*      (2018.01)
*H04W 48/18*   (2009.01)
(Continued)

(52) U.S. Cl.
CPC ............. *H04W 48/18* (2013.01); *H04W 8/04* (2013.01); *H04W 8/20* (2013.01); *H04W 12/06* (2013.01)

(58) Field of Classification Search
CPC ..... H04W 12/06; H04W 88/06; H04W 48/18; H04W 88/16; H04W 76/02; H04W 76/022; H04W 48/02; H04W 88/08; H04W 8/08
See application file for complete search history.

(56) References Cited

U.S. PATENT DOCUMENTS

2007/0283421 A1* 12/2007 Hirose .................... H04L 63/08
                                                             726/4
2010/0080186 A1    4/2010  Guo et al.
(Continued)

FOREIGN PATENT DOCUMENTS

EP     2 763 496 A1    8/2014
JP     2017-518006 A   6/2017
(Continued)

OTHER PUBLICATIONS

English translation of Japanese Notification of Reasons for Refusal issued in Japanese Patent Application No. 2017-513836, dated Feb. 6, 2018, 5 pages.
(Continued)

*Primary Examiner* — Khalid Shaheed
(74) *Attorney, Agent, or Firm* — Wilmer Cutler Pickering Hale and Dorr LLP

(57) ABSTRACT

In order for more effectively supporting a Dedicated Core Network, there is provided a network system including a first node (30) that establishes secure connection with a UE (10) initially attempting to attach to a network, through a radio base station (20), and a second node (40) to which the UE (10) is redirected from the first node (30) through the radio base station (20). Upon the redirection, the first node (30) sends information on the first node (30) itself to the second node (40) through the radio base station (20). The second node (40) uses the information to retrieve security
(Continued)

context necessary for establishing the connection with the UE (10) from the first node (30).

18 Claims, 8 Drawing Sheets

(51) Int. Cl.
*H04W 8/20* (2009.01)
*H04W 8/04* (2009.01)
*H04W 12/06* (2009.01)

(56) References Cited

U.S. PATENT DOCUMENTS

| | | |
|---|---|---|
| 2011/0230188 A1 | 9/2011 | Gemski |
| 2013/0142056 A1* | 6/2013 | Abplanalp ............... H04W 8/18 370/252 |
| 2017/0188280 A1 | 6/2017 | Watfa et al. |

FOREIGN PATENT DOCUMENTS

| | | |
|---|---|---|
| WO | WO-2013047822 A1 | 4/2013 |
| WO | WO-2015/172088 A1 | 11/2015 |

OTHER PUBLICATIONS

International Search Report, Corresponding to PCT/JP2015/002635, dated Sep. 22, 2015, 3 pp.

3GPP TR 23.888 V1.4.0, Technical Report, "3rd Generation Partnership Project; Technical Specification Group Services and System Aspects; System Improvements for Machine-Type Communications; (Release 11)," Aug. 2011, 139 pp.

SA WG2 #100 S2-133910, "23.401 CR2606R3: Addition of Subscription Information for Selecting a Specific Network," San Francisco, Nov. 11-15, 2013, pp. 7 and 9, 47 pp.

TSG SA WG2 #100, S2-133909, "Discussion on Core Network Type Selection Based on the Subscription Information", San Francisco, USA, Nov. 11-15, 2013, 21 pp.

TSG SA WG2 #99 S2-133304, "Addition of Subscription Information for Selecting a Specific Network," Xiamen, China, Sep. 23-27, 2013, p. 4, 6 pages.

\* cited by examiner

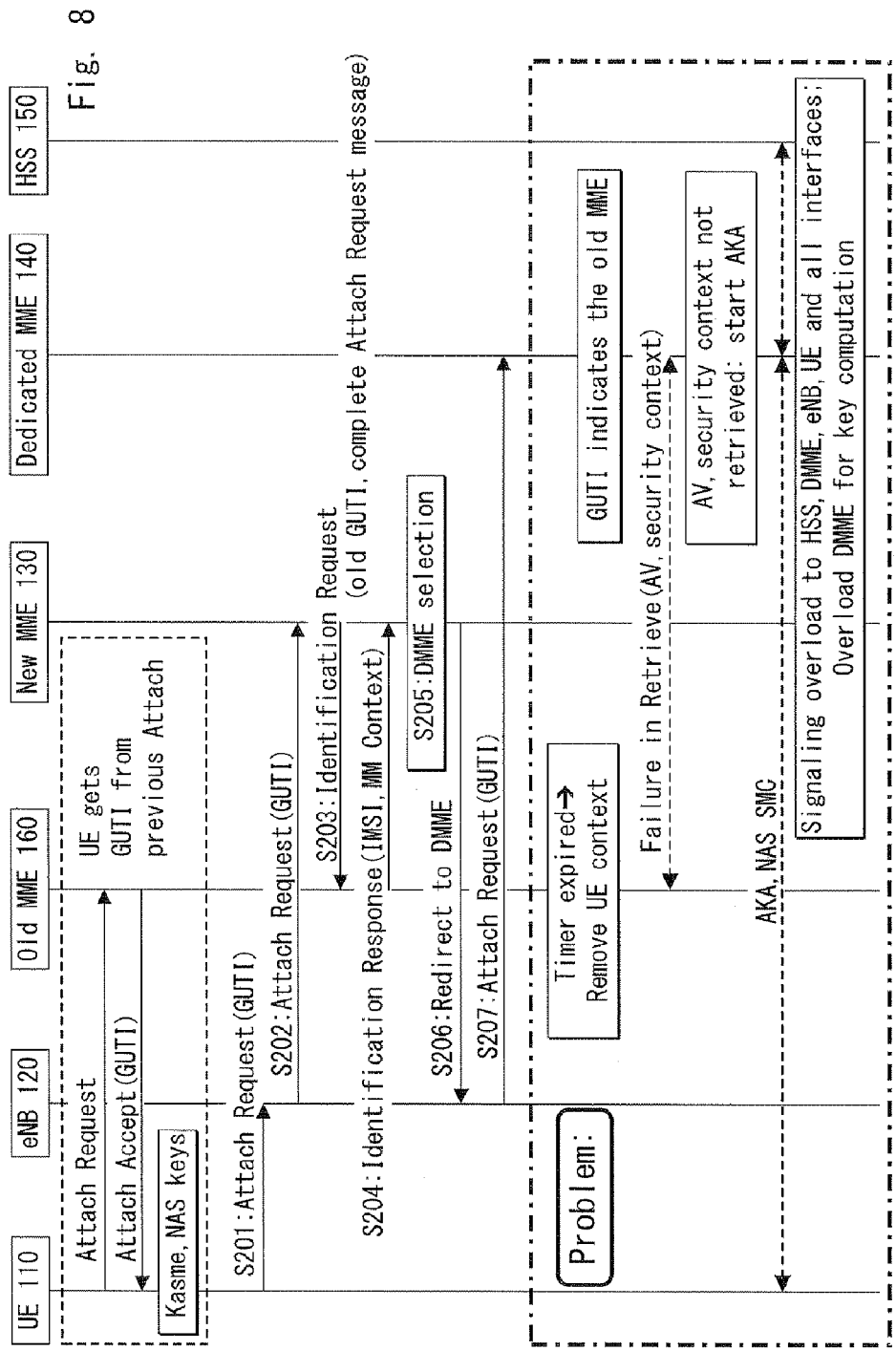

APPARATUS, SYSTEM AND METHOD FOR DEDICATED CORE NETWORK

CROSS-REFERENCE TO RELATED APPLICATIONS

The present application is a national stage application of International Application No. PCT/JP2015/002635 entitled "Apparatus, System and Method for Dedicated Core Network" filed on May 26, 2015, which claims the benefit of priority from Japanese Patent Application No. JP2014-112269, filed on May 30, 2014, the disclosures of which are incorporated herein in their entirety by reference thereto.

TECHNICAL FIELD

The present invention relates to an apparatus, a system and a method for a Dedicated Core Network, and particularly to a technique to ensure that a UE (User Equipment) is served by the appropriate core network.

BACKGROUND ART

Recently, enhancement to support the Dedicated Core Network has been studied by 3GPP (3rd Generation Partnership Project).

The Dedicated Core Network intends that for example, a specific type of subscriber (i.e., a specific type of UE) is redirected to an MME (Mobility Management Entity)/SGSN (Serving GPRS (General Packet Radio Service) Support Node) dedicated to serve that UE. The Dedicated Core Network is also sometimes referred to as "Specific Core Network" or "Overlay Core Network".

NPL 1 discloses the most prompting message flow to realize the Dedicated Core Network. In this message flow, when a UE sends an Attach Request message to new MME through an eNB (evolved Node B) (i.e., in a case of IMSI (International Mobile Subscriber Identity) attach), the one MME obtains information to use another specific MME from an HSS (Home Subscriber Server). Then, the one MME instructs the eNB to redirect the Attach Request message to the specific MME. Upon the redirection, the eNB performs the Attach procedure again to the specific MME.

NPL 2 also discloses a message flow similar to that disclosed in NPL 1.

CITATION LIST

Non Patent Literature

NPL 1: TSG SA WG2 #99 S2-133304, "Addition of Subscription Information for Selecting a Specific Network", 2013-09, pp. 4

NPL 2: SA WG2 #100 S2-133910, "23.401 CR2606R3: Addition of Subscription Information for Selecting a Specific Network", 2013-11, pp. 7 and 9

NPL 3: TSG SA WG2 #100 S2-133909, "Discussion on Core Network Type Selection based on the Subscription Information", 2013-11

SUMMARY OF INVENTION

Technical Problem

However, the inventors of this application have found that there is a problem that the message flow disclosed in NPLs 1 and 2 decreases the efficiency upon supporting the Dedicated Core Network.

Specifically, upon the re-performance of Attach procedure, the specific MME redundantly performs AKA (Authentication and Key Agreement) procedure and NAS (Non-Access Stratum) SMC (Security Mode Command) procedure that have been already performed by the different MME to which the UE attempted to attach. Therefore, there are caused signaling overload to devices/nodes involved in the redundant AKA/NAS SMC procedures and all interface therebetween, as well as overload to the specific MME.

Moreover, NPLs 2 and 3 each discloses another message flow for GUTI (Globally Unique Temporary Identity) attach, in which the specific MME contacts an MME referenced by the GUTI to retrieve security context.

However, even in this message flow, there are also caused the above-mentioned signaling overload and overload to the specific MME. This is because the GUTI merely indicates the old MME which may has removed the security context after the expiration of timer, after all the specific MME redundantly performs the AKA/NAS SMC procedures.

Note that details of these problems will be discussed more fully in the following description.

Accordingly, an exemplary object of the present invention is to provide a solution for more effectively supporting a Dedicated Core Network.

Solution to Problem

In order to achieve the above-mentioned object, a network system according to first exemplary aspect of the present invention includes: a first node that establishes secure connection with a UE (User Equipment) initially attempting to attach to a network, through a radio base station; and a second node to which the UE is redirected from the first node through the radio base station. Upon the redirection, the first node sends information on the first node itself to the second node through the radio base station. The second node uses the information to retrieve security context necessary for establishing the connection with the UE from the first node.

Further, according to second exemplary aspect of the present invention, there is provided a method of control for a network system including a first node that establishes secure connection with a UE initially attempting to attach to a network, through a radio base station, and a second node to which the UE is redirected from the first node through the radio base station. This method includes: sending, upon the redirection, information on the first node from the first node to the second node through the radio base station; and using, by the second node, the information to retrieve security context necessary for establishing the connection with the UE from the first node.

Further, a network system according to third exemplary aspect of the present invention includes: a first node that receives an attach request from a UE initially attempting to attach to a network, through a radio base station; and a second node to which the attach request is redirected from the first node through the radio base station. Upon the reception of the attach request, the first node skips establishment of secure connection with the UE through the radio base station. Upon the redirection, the first node sends, to the second node through the radio base station, subscription information indicating that the UE is one to be redirected to the second node. In response to receiving the subscription information, the second node establishes the secure connection with the UE.

Further, according to fourth exemplary aspect of the present invention, there is provided a method of control for a network system including a first node that receives an attach request from a UE initially attempting to attach to a network, through a radio base station, and a second node to which the attach request is redirected from the first node through the radio base station. This method includes: skipping, by the first node upon the reception of the attach request, establishment of secure connection with the UE through the radio base station; sending, upon the redirection, from the first node to the second node through the radio base station, subscription information indicating that the UE is one to be redirected to the second node; and establishing, by the second node in response to receiving the subscription information, the secure connection with the UE.

Further, a network system according to fifth exemplary aspect of the present invention includes: a first node that established secure connection with a UE through a radio base station when the UE attached to a network previously, and that assigned a temporary identity to the UE; a second node that receives an attach request including the temporary identity from the UE through the radio base station; and a third node to which the attach request is redirected from the second node through the radio base station. The second node retrieves security context necessary for establishing the connection with the UE from the first node, and upon the redirection, sends information on the second node itself to the third node through the radio base station. The third node uses the information to retrieve the security context from the second node.

Further, according to sixth exemplary aspect of the present invention, there is provided a method of control for a network system including a first node that established secure connection with a UE through a radio base station when the UE attached to a network previously and that assigned a temporary identity to the UE, a second node that receives an attach request including the temporary identity from the UE through the radio base station, and a third node to which the attach request is redirected from the second node through the radio base station. This method includes: retrieving, by the second node, security context necessary for establishing the connection with the UE from the first node; sending, upon the redirection, information on the second node from the second node to the third node through the radio base station; and using, by the third node, the information to retrieve the security context from the second node.

Further, a network system according to seventh exemplary aspect of the present invention includes: a first node that established secure connection with a UE through a radio base station when the UE attached to a network previously, and that assigned a temporary identity to the UE; a second node that receives an attach request including the temporary identity from the UE through the radio base station; and a third node to which the attach request is redirected from the second node through the radio base station. The second node retrieves security context necessary for establishing the connection with the UE from the first node, and upon the redirection, sends the security context to the third node through the radio base station.

Further, according to eighth exemplary aspect of the present invention, there is provided a method of control for a network system including a first node that established secure connection with a UE through a radio base station when the UE attached to a network previously and that assigned a temporary identity to the UE, a second node that receives an attach request including the temporary identity from the UE through the radio base station, and a third node to which the attach request is redirected from the second node through the radio base station. This method includes: retrieving, by the second node, security context necessary for establishing the connection with the UE from the first node; and sending, upon the redirection, the security context from the second node to the third node through the radio base station.

Further, a network system according to ninth exemplary aspect of the present invention includes: a first node that established secure connection with a UE through a radio base station when the UE attached to a network previously, and that assigned a temporary identity to the UE; a second node that receives an attach request including the temporary identity from the UE through the radio base station; and a third node to which the attach request is redirected from the second node through the radio base station. The first node maintains security context necessary for establishing the secure connection with the UE till an identification request is received from the third node. Upon the redirection, the third node sends the identification request to the first node to retrieve the security context from the first node.

Further, according to tenth exemplary aspect of the present invention, there is provided a method of control for a network system including a first node that established secure connection with a UE through a radio base station when the UE attached to a network previously and that assigned a temporary identity to the UE, a second node that receives an attach request including the temporary identity from the UE through the radio base station, and a third node to which the attach request is redirected from the second node through the radio base station. This method includes: maintaining, by the first node, security context necessary for establishing the secure connection with the UE till an identification request is received from the third node; and sending, by the third node upon the redirection, the identification request to the first node to retrieve the security context from the first node.

Further, a core network system according to eleventh exemplary aspect of the present invention includes: a plurality of core network nodes; and a server. In this system, a UE sends a message to a first core network node through a radio base station. The UE is redirected from the first core network node to a second core network node based on subscription information of the UE provided by the server. The first core network node sends a first message including information on the redirection to the radio base station. The radio base station sends a second message including the information to the second core network node.

Further, according to twelfth exemplary aspect of the present invention, there is provided a method for a core network system including a plurality of core network nodes and a server. This method includes: a step that a UE (User Equipment) sends a message to a first core network node through a radio base station; a step that the UE is redirected from the first core network node to a second core network node based on subscription information of the UE provided by the server; a step that the first core network node sends a first message including information on the redirection to the radio base station; and a step that the radio base station sends a second message including the information to the second core network node.

Further, a UE according to thirteenth exemplary aspect of the present invention includes: means for sending a message to a first core network node through a radio base station. The UE is redirected from the first core network node received the message to a second core network node based on subscription information of the UE provided by a server. In the redirection, the first core network node sends a first message including information on the redirection to the radio base station, and the radio base station sends a second message including the information to the second core network node.

Furthermore, according to fourteenth exemplary aspect of the present invention, there is provided a method for a UE. This method includes: a step that the UE sends a message to a first core network node through a radio base station; and a step that the UE is redirected from the first core network node received the message to a second core network node based on subscription information of the UE provided by a server. In the redirection, the first core network node sends a first message including information on the redirection to the radio base station, and the radio base station sends a second message including the information to the second core network node.

Advantageous Effects of Invention

According to the present invention, it is possible to solve at least one of the above-mentioned problems, and thus to provide a solution for more effectively supporting a Dedicated Core Network.

BRIEF DESCRIPTION OF DRAWINGS

FIG. 8 is a sequence diagram for explaining problems in typical GUTI attach procedure.

DESCRIPTION OF EMBODIMENTS

Hereinafter, several exemplary embodiments according to the present invention will be described with reference to the accompanying drawings.

First Exemplary Embodiment

Figure 1:
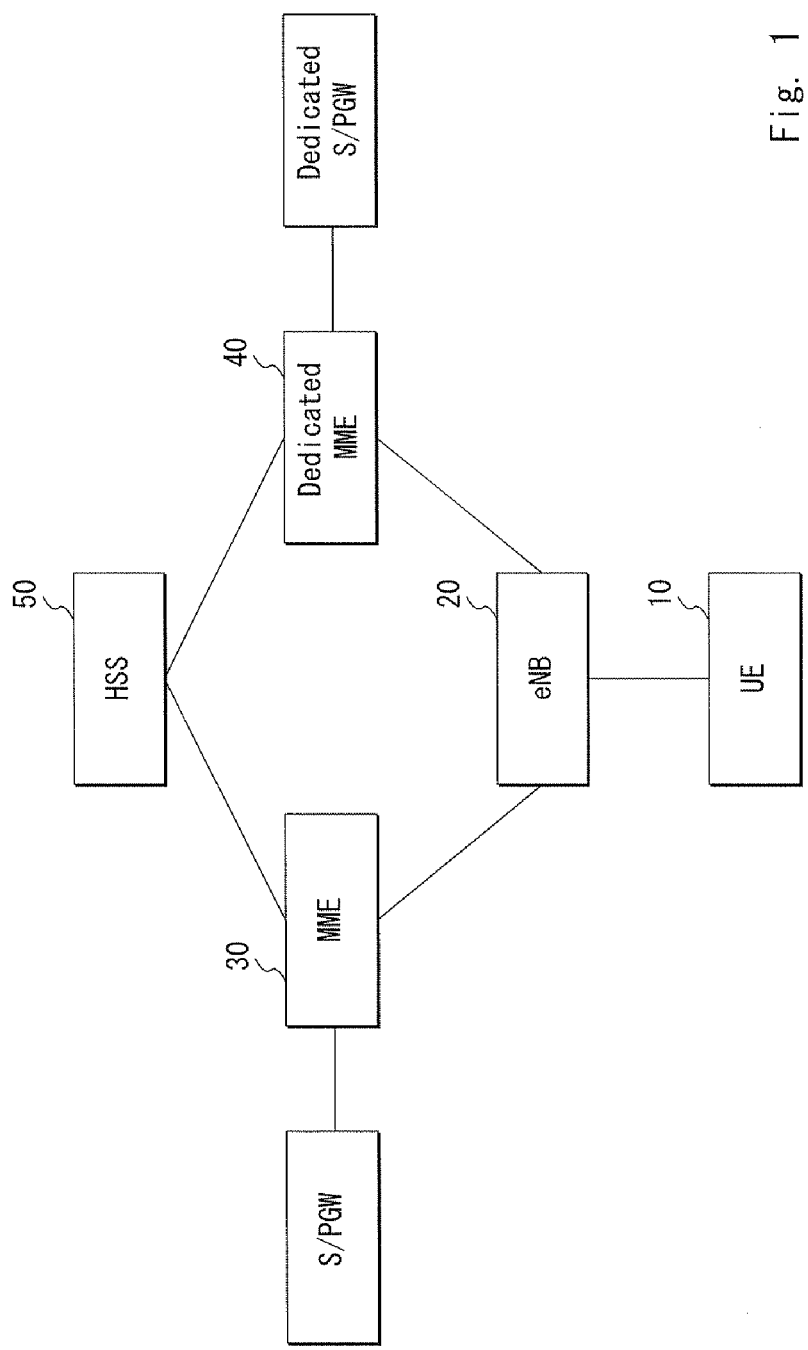
FIG. 1 is a block diagram showing a configuration example of a network system according to a first exemplary embodiment of the present invention.

As shown in FIG. 1, a network system according to this exemplary embodiment includes MMEs 30 and 40 by way of example only. Among them, the MME 30 is the one to which a UE 10 initially attaches through an eNB 20 serving as a radio base station, and thus sometimes referred to as "New MME" in the following description. On the other hand, the MME 40 is the one dedicated to serve the UE 10 according to subscription and to which the UE 10 is redirected from the MME 30, and thus referred to as "Dedicated MME" or "DMME". Note that the MME 40 can also be referred to as "Specific MME", in conformity with the Dedicated Core Network being sometimes referred to as "Specific Core Network". If necessary, each of the MMEs 30 and 40 can obtain, from an HSS 50, subscription information on the UE 10, information necessary for authenticating the UE 10, and the like. The New MME 30 is also connected to an S-GW (Serving Gateway) and/or a P-GW (PDN (Public Data Network) Gateway). Similarly, the Dedicated MME 40 is also connected to a Dedicated S-GW and/or a Dedicated P-GW.

In general, this exemplary embodiment deals with IMSI attach in E-UTRAN (Evolved Universal Terrestrial Radio Access Network), particularly with a case where the New MME 30 redirects an Attach Request message received from the eNB 20 to the DMME 40, according to the subscription information on the UE 10 obtained from the HSS 50.

Figure 7:
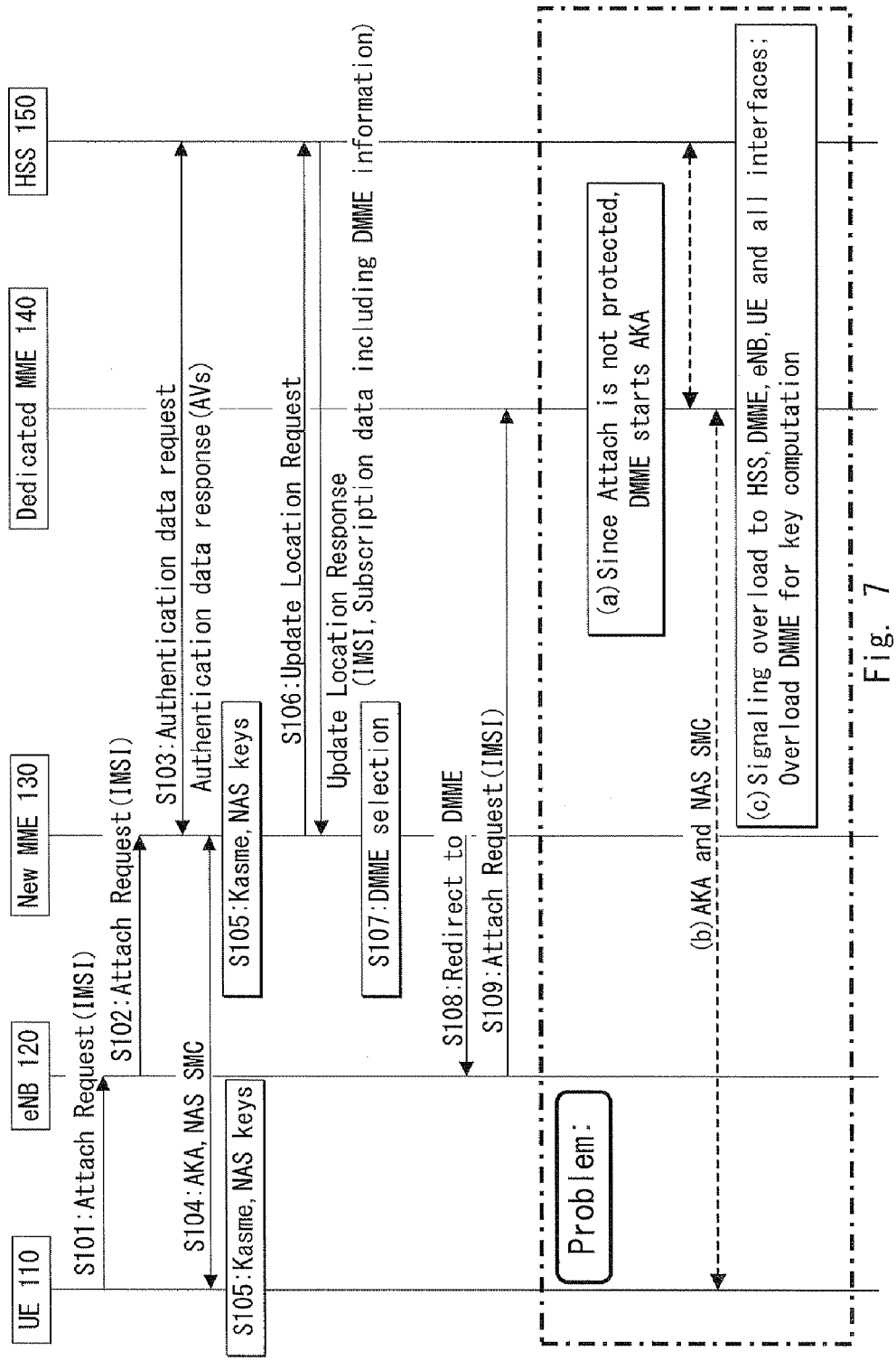
FIG. 7 is a sequence diagram for explaining problems in typical IMSI attach procedure.

Next, prior to describing operation examples of this exemplary embodiment, there are firstly defined problems in typical IMSI attach procedure as disclosed by NPLs 1 and 2 with reference to FIG. 7. Then, there will be described solutions for addressing these problems as the operation examples. The solutions include Option 1 shown in FIG. 2 and Option 2 shown in FIG. 3.

Problem Defined:

As shown in FIG. 7, in the typical IMSI attach procedure, a UE 110 sends an Attach Request message including its IMSI to an eNB 120 (step S101), and the eNB 120 forwards the Attach Request message to an New MME 130 (step S102).

Upon receiving the Attach Request message, the New MME 130 sends an Authentication data request message to an HSS 150, and as a response thereto, receives an Authentication data response message including AVs (Authentication Vectors) (step S103). Then, the New MME 130 corporates with the UE 110 to perform AKA procedure and NAS SMC procedure (step S104). As a result, the UE 10 and the New MME 130 each can share Kasme (Key for access security management entity) and NAS keys, so that secure connection is established between them (step S105).

After that, the New MME 130 sends an Update Location Request message to the HSS 150, and as a response thereto, receives an Update Location Response message (step S106). The Update Location Response message includes the IMSI and the subscription information/data. Moreover, the subscription information includes information on a Dedicated MME 140 (hereinafter, such information will be sometimes referred to as "DMME information").

Then, the New MME 130 selects the Dedicated MME 140 to which the UE 110 should be redirected based on the DMME information (step S107), and sends a Redirect message to the eNB 120 (step S108). Upon receiving the Redirect message, the eNB 120 forwards the Attach Request message to the Dedicated MME 140 (step S109).

However, at this time, the following problems arise:
(a) Since the Attach Request message is not protected, the Dedicated MME 140 starts AKA procedure to the UE 10;
(b) due to (a), the Dedicated MME 140 sends/receives Authentication data request/response messages and Update Location Request/Response messages to/from the HSS 150, and also corporates with the UE 110 to perform AKA procedure and NAS SMC procedure; and
(c) due to (a) and (b), there are caused signaling overload to the HSS 150, the Dedicated MME 140, the eNB 120, the UE 110 and all interfaces therebetween, as well as overload to the Dedicated MME 140 for key computation.

Solutions:
(Option 1)

Figure 2:
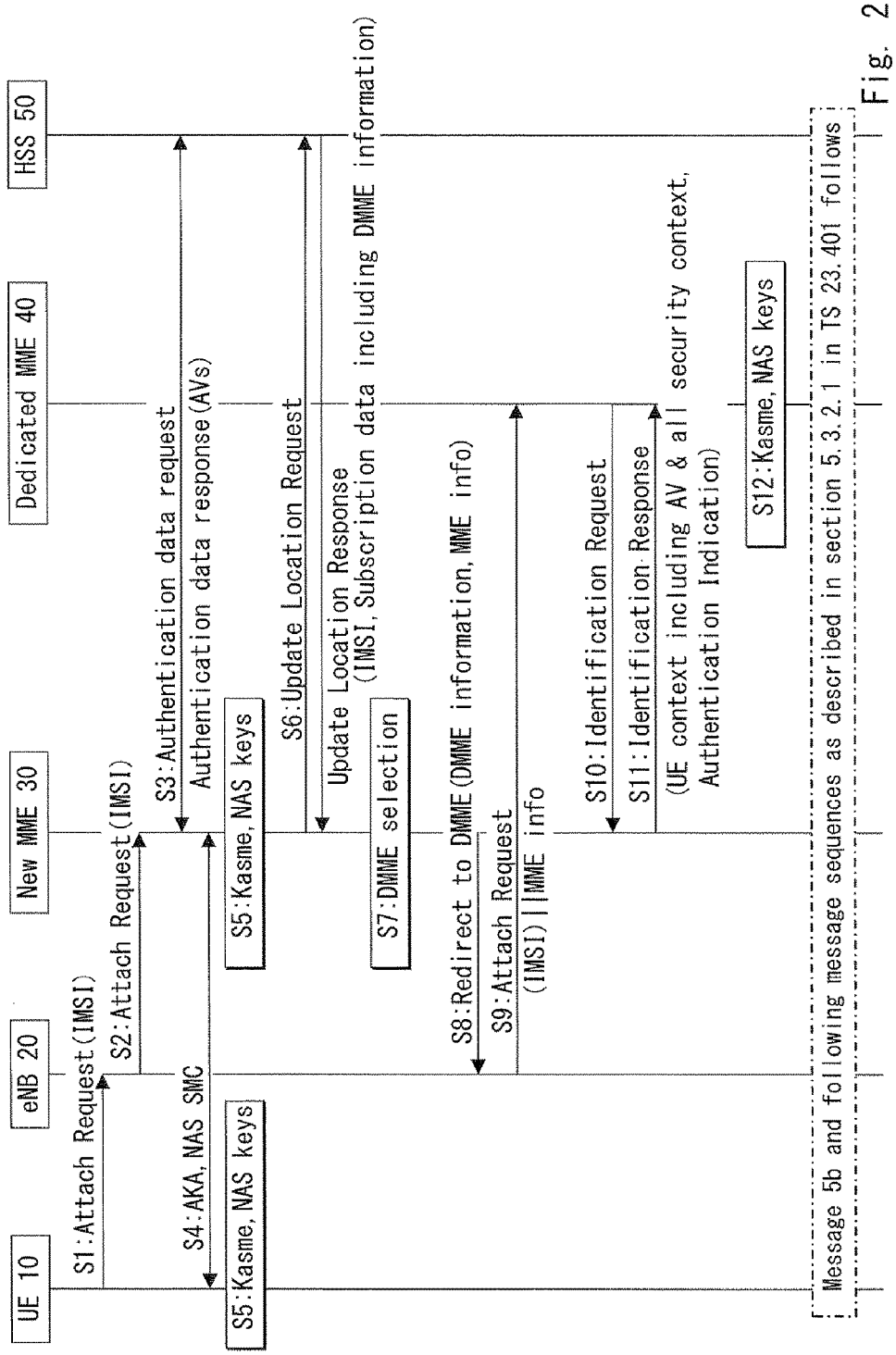
FIG. 2 is a sequence diagram showing a first example of operations in the network system according to the first exemplary embodiment.

FIG. 2 shows a sequence diagram for this option. Processes at steps S1 to S7 are performed in a similar manner to those at the above-mentioned steps S101 to S107 shown in FIG. 7.

Meanwhile, upon the redirection, the New MME 30 sends to the eNB 20 a Redirect message including information on the New MME 30 itself (herein after, such information will be sometimes referred to as "MME information") (step S8). For example, the MME information includes an ID (identification, identity), an FQDN (Fully Qualified Domain Name) or an IP (Internet Protocol) address assigned to the New MME 30. Then, the eNB 20 forwards to the Dedicated MME 40 the MME information with being included in an Attach Request message (step S9).

The Dedicated MME 40 uses the received MME information to retrieve, from the New MME 30, security context concerning secure connection which has been established between the UE 10 and the New MME 30. Specifically, the Dedicated MME 40 sends an Identification Request message to the New MME 30 (step S10), and as a response thereto, receives an Identification Response message including UE context (step S11). The UE context includes the AVs and all security context. Then, the Dedicated MME 40 extracts the Kasme and the NAS keys from the retrieved UE context (step S12).

After that, a message 5b and the subsequent message sequences as disclosed in 3GPP TS 23.401, section 5.3.2.1 follows.

According to this option, the Dedicated MME 40 is indicated about the MME information such that the Dedicated MME 40 can retrieve necessary security context from the New MME 30. Therefore, unlike the typical IMSI attach procedure, the Dedicated MME 40 needs not to perform AKA procedure and NAS SMC procedure. Thus, compared with the typical IMSI attach procedure, it is possible to drastically reduce signaling overload, as well as overload to the Dedicated MME for key computation. Moreover, since the existing message sequences can be reused (the Identification Request/Response messages are also the existing ones as will be described later), it is possible to minimize the impact on the mobile communication system.

Further, at the above-mentioned step S11, the New MME 30 may include, in the Identification Response message, an Authentication Indication which indicates that the UE 10 has been authenticated as the one to be redirected to the Dedicated MME 40. In this case, the Dedicated MME 40 needs not to contact the HSS 50 for the purpose of authenticating the UE 10, so that it is possible to further reduce signaling overload.

(Option 2)

Figure 3:
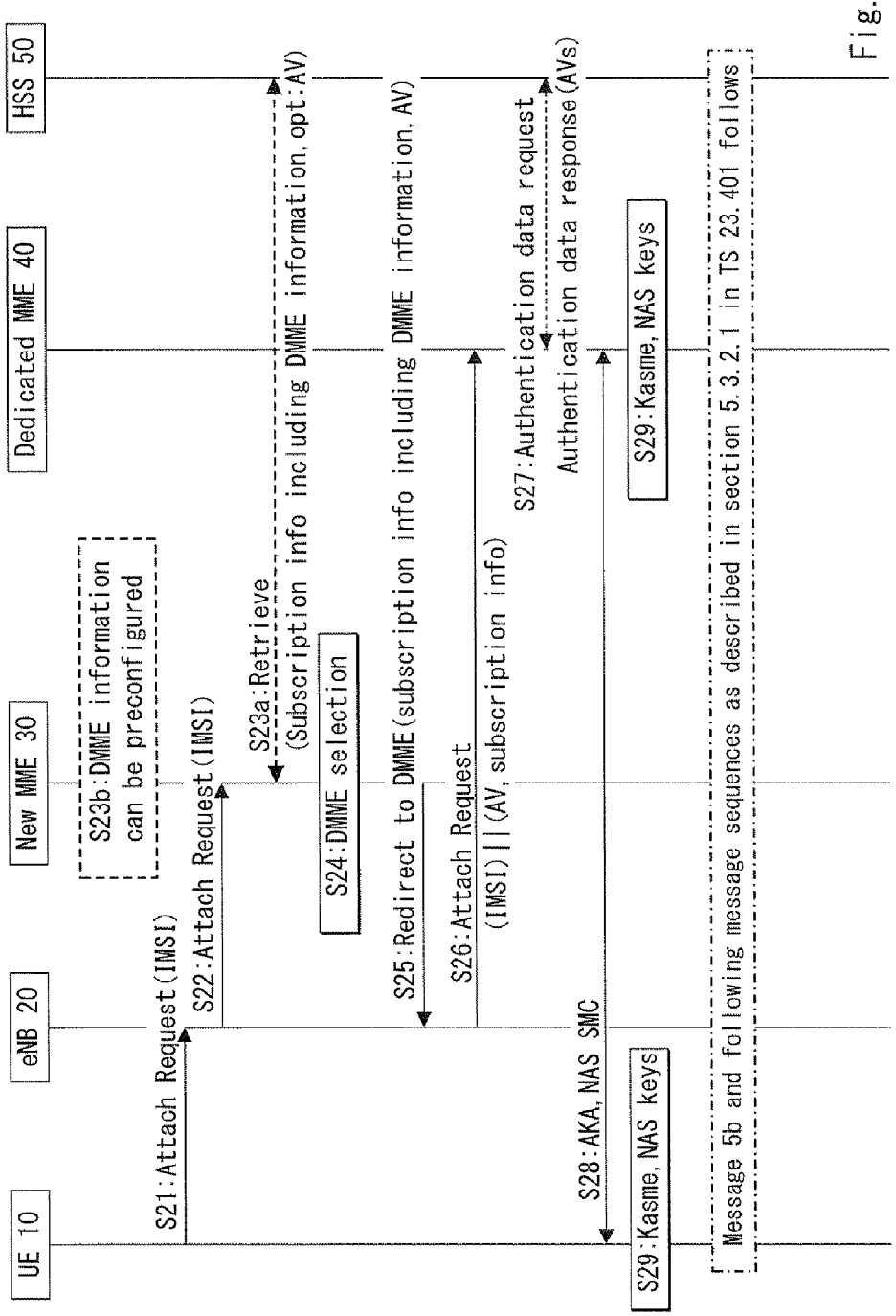
FIG. 3 is a sequence diagram showing a second example of operations in the network system according to the first exemplary embodiment.

FIG. 3 shows a sequence diagram for this option. Processes at steps S21 and S22 are performed in a similar manner to those at the above-mentioned steps S1 and S2 shown in FIG. 2.

Meanwhile, upon receiving the Attach Request message, the New MME 30 firstly retrieves from the HSS 50 the subscription information including the DMME information (step S23a).

As described above, the DMME information indicates that the UE 10 should be redirected to the Dedicated MME 40. Therefore, the New MME 30 skips establishment of secure connection with the UE 10. Specifically, the New MME 30 does not perform the AKA procedure, the NAS SMC procedure, the computation of NAS keys, and the like.

Then, the New MME 30 selects the Dedicated MME 40 based on the DMME information (step S24), and sends to the eNB 20 a Redirect message including the subscription information (which also includes the DMME information) (step S25). Then, the eNB 20 forwards to the Dedicated MME 40 the subscription information with being included in an Attach Request message (step S26).

In response to receiving the subscription information (i.e., DMME information), the Dedicated MME 40 establishes secure connection with the UE 10 through the eNB 20, as a substitute for the New MME 30. Specifically, Dedicated MME 40 sends an Authentication data request message to the HSS 50, and as a response thereto, receives an Authentication data response message including the AVs (step S27). Then, the Dedicated MME 40 corporates with the UE 10 to perform AKA procedure and NAS SMC procedure (step S28). As a result, the UE 10 and the Dedicated MME 40 each can share Kasme and NAS keys, so that secure connection is established therebetween through the eNB 20 (step S29).

After that, a message 5b and the subsequent message sequences as disclosed in 3GPP TS 23.401, section 5.3.2.1 follows.

According to this option, as will be understood by comparing the sequence shown in FIG. 3 with that shown in FIG. 2, it is possible to reduce the amount of signaling compared to the above-mentioned Option 1. Moreover, since the New MME 30 skips the establishment of secure connection, it is also possible to reduce overload to the New MME 30.

Further, as a substitute for the above-mentioned step S23a, the DMME information may be preconfigured in the New MME 30 (step S23b). In this case, the New MME 30 can also skip the retrieval of subscription information from the HSS 50 when it receives the initial Attach Request from the UE 10, so that it is possible to further reduce the amount of signaling.

Furthermore, at the above-mentioned step S23a, the New MME 30 may further retrieve the AVs from the HSS 50. The retrieved AVs can be transferred to the Dedicated MME 40 through the eNB 20 with the Redirect message shown at the above-mentioned step S25 and the Attach Request message shown at the above-mentioned step S26. In this case, the Dedicated MME 40 can skip the acquisition of AVs from the HSS 50 shown at the above-mentioned step S27, so that it is possible to further reduce the amount of signaling.

Second Exemplary Embodiment

Figure 4:
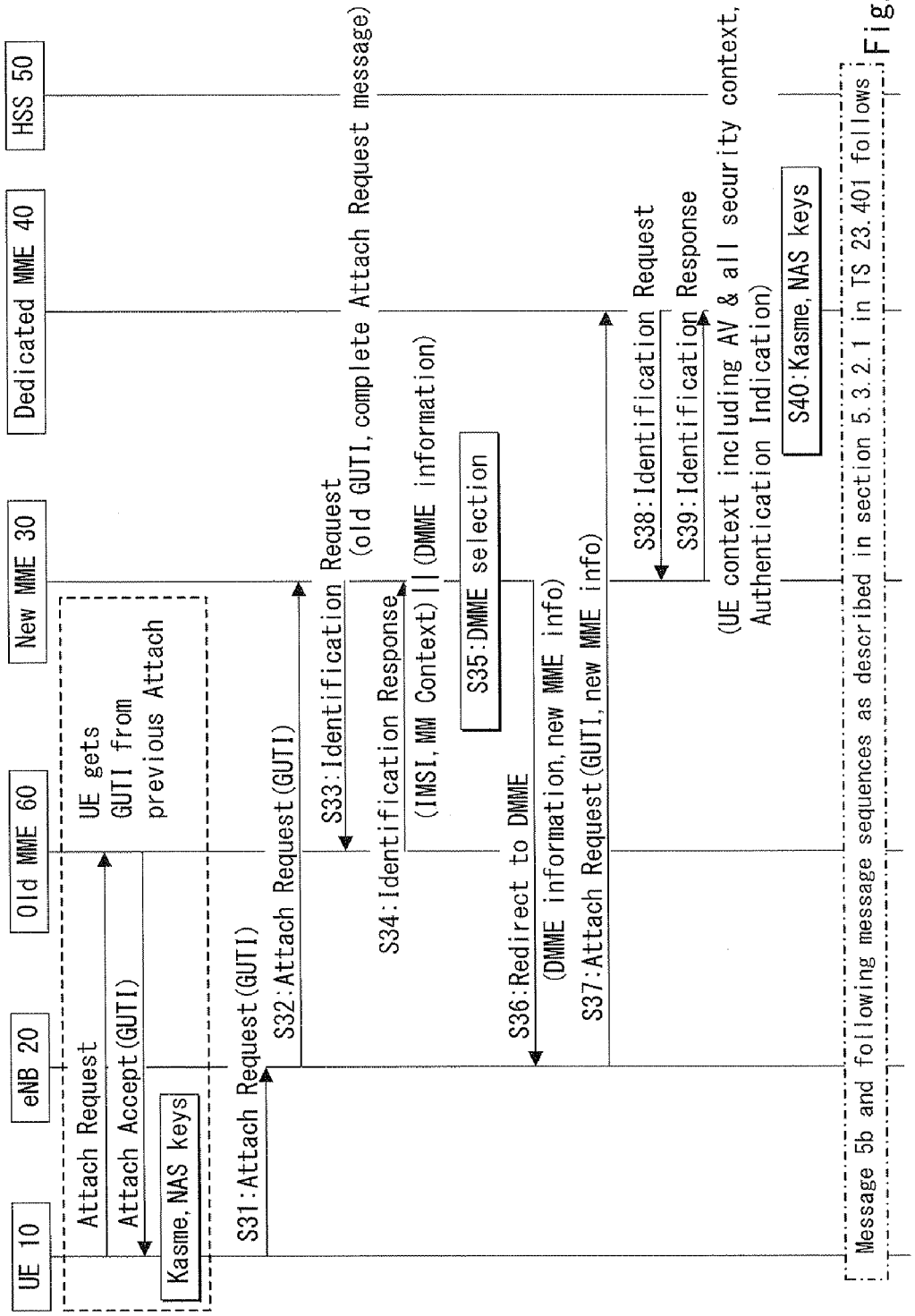
FIG. 4 is a sequence diagram showing a first example of operations in a network system according to a second exemplary embodiment of the present invention.

As shown in FIG. 4, a network system according to this exemplary embodiment further includes an MME 60 in addition to the above-mentioned MMEs 30 and 40. The MME 60 is the one to which the UE 10 previously attached, and thus sometimes referred to as "Old MME" in the following description. If necessary, the Old MME 60 can also obtain, from the HSS 50, the subscription information, the DMME information, the AVs and the like. Note that there is a case where the UE 10 previously attached to an SGSN (i.e., "Old SGSN"). Even in this case, the following description about the Old MME can be similarly applied to that about the Old SGSN.

In general, this exemplary embodiment deals with GUTI attach in E-UTRAN, particularly with a case where the New MME 30 redirects an Attach Request message received from the eNB 20 to the DMME 40, according to the DMME information obtained from the Old MME 60.

Next, prior to describing operation examples of this exemplary embodiment, there are firstly defined problems in typical GUTI attach procedure as disclosed by NPLs 2 and 3 with reference to FIG. 8. Then, there will be described solutions for addressing these problems as the operation examples. The solutions include Option 1 shown in FIG. 4, Option 2 shown in FIG. 5, and Option 3 shown in FIG. 6.
Problem Defined:

As shown by dotted lines in FIG. 8, assume that the UE 110 previously attached to an Old MME 160, and the Old MME 160 assigned a GUTI to the UE 110, so that the UE has gotten the GUTI.

In the typical GUTI attach procedure, the UE 110 sends an Attach Request message including the GUTI to the eNB 120 (step S201), and the eNB 120 forwards the Attach Request message to the New MME 130 (step S202).

Upon receiving the Attach Request message, the New MME 130 sends to the Old MME 160 an Identification Request message including the GUTI and the complete Attach Request message (step S203), and as a response thereto, receives an Identification Response message including the IMSI of the UE 110 and MM (Mobility Management) Context (step S204).

Then, the New MME 130 selects the Dedicated MME 140 (step S205), and sends a Redirect message to the eNB 120 (step S206). Upon receiving the Redirect message, the eNB 120 forwards the Attach Request message to the Dedicated MME 140 (step S207).

However, the Old MME 160 might remove UE context (i.e., security context) after a predetermined timer expired. Moreover, the GUTI merely indicates the Old MME 160. Therefore, the Dedicated MME 140 fails in retrieving the AVs and the security context from the Old MME 160, and thus starts AKA procedure.

Accordingly, as with the typical IMSI attach procedure, the following problems arise:

signaling overload to the HSS 150, the Dedicated MME 140, the eNB 120, the UE 110 and all interfaces therebetween; and overload to the Dedicated MME 140 for key computation.
Solutions:
(Option 1)

FIG. 4 shows a sequence diagram for this option. Processes at steps S31 to S35 are performed in a similar manner to those at the above-mentioned steps S201 to S205 shown in FIG. 8.

Meanwhile, upon the redirection, the New MME 30 sends to the eNB 20 a Redirect message including information on the New MME 30 itself (i.e., MME information) (step S36). Then, the eNB 20 forwards to the Dedicated MME 40 the MME information with being included in an Attach Request message (step S37).

The Dedicated MME 40 uses the received MME information to retrieve, from the New MME 30, the security context which has been obtained at the above-mentioned step S34 by the New MME 30 from the Old MME 60. Specifically, the Dedicated MME 40 sends an Identification Request message to the New MME 30 (step S38), and as a response thereto, receives an Identification Response message including UE context (step S39). As described above, the UE context includes the AVs and all security context. Then, the Dedicated MME 40 extracts the Kasme and the NAS keys from the retrieved UE context (step S40).

After that, a message 5b and the subsequent message sequences as disclosed in 3GPP TS 23.401, section 5.3.2.1 follows.

According to this option, the Dedicated MME 40 is indicated about the MME information such that the Dedicated MME 40 can retrieve necessary security context from the New MME 30. Therefore, unlike the typical GUTI attach procedure, the Dedicated MME 40 needs not to contact the Old MME 60 for the purpose of retrieving the AVs and the security context from the Old MME 60, and thus needs not to start AKA procedure if it fails in retrieving the security context from the Old MME 60. Thus, compared with the typical GUTI attach procedure, it is possible to drastically reduce signaling overload, as well as overload to the Dedicated MME for key computation. Moreover, since the existing message sequences can be reused, it is possible to minimize the impact on the mobile communication system.

Further, at the above-mentioned step S39, the New MME 30 may include, in the Identification Response message, an Authentication Indication which indicates that the UE 10 has been authenticated as the one to be redirected to the Dedicated MME 40. In this case, the Dedicated MME 40 needs not to contact the HSS 50 for the purpose of authenticating the UE 10, so that it is possible to further reduce signaling overload.
(Option 2)

Figure 5:
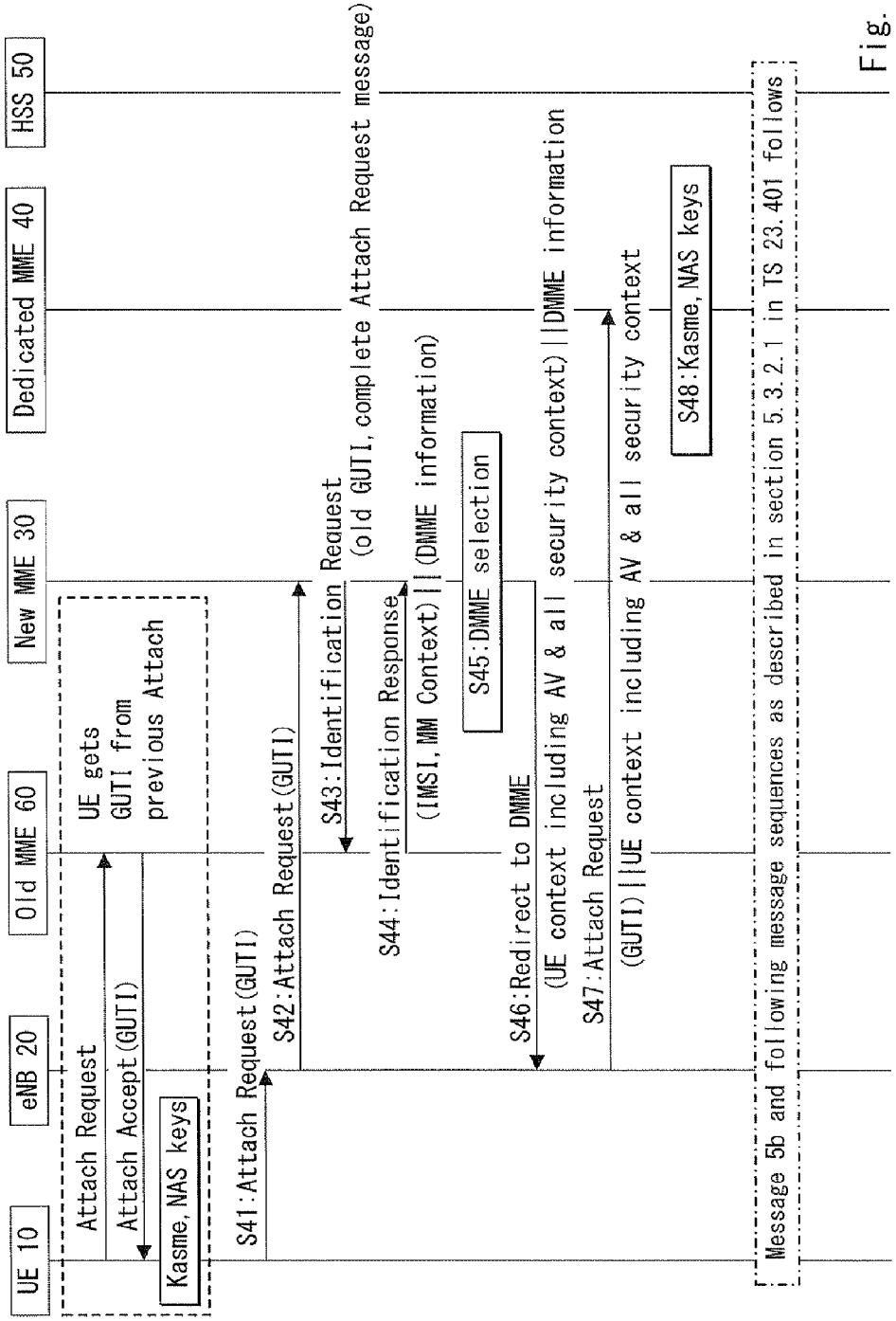
FIG. 5 is a sequence diagram showing a second example of operations in the network system according to the second exemplary embodiment.

FIG. 5 shows a sequence diagram for this option. Processes at steps S41 to S45 are performed in a similar manner to those at the above-mentioned steps S31 to S35 shown in FIG. 4.

Meanwhile, upon the redirection, the New MME 30 sends to the eNB 20 a Redirect message including the UE context (step S46). Then, the eNB 20 forwards to the Dedicated MME 40 the UE context with being included in an Attach Request message (step S47). As described above, the UE context includes the AVs and all security context.

Then, the Dedicated MME 40 extracts the Kasme and the NAS keys from the received UE context (step S48).

After that, a message 5b and the subsequent message sequences as disclosed in 3GPP TS 23.401, section 5.3.2.1 follows.

According to this option, the Dedicated MME 40 needs not to contact any MME to retrieve the UE context. Therefore, it is possible to reduce the amount of signaling compared to the above-mentioned Option 1, and it is also possible to reduce to reduce overload to the Dedicated MME 40.

Further, this option may be optimized such that the Old MME 60 remembers that integrity check for the Attach Request message is done at the above-mentioned step S43. In this case, the Dedicated MME 40 needs not to do the integrity check again at the above-mentioned step S47, so that it is possible to further reduce the overload to the Dedicated MME 40.
(Option 3)

Figure 6:
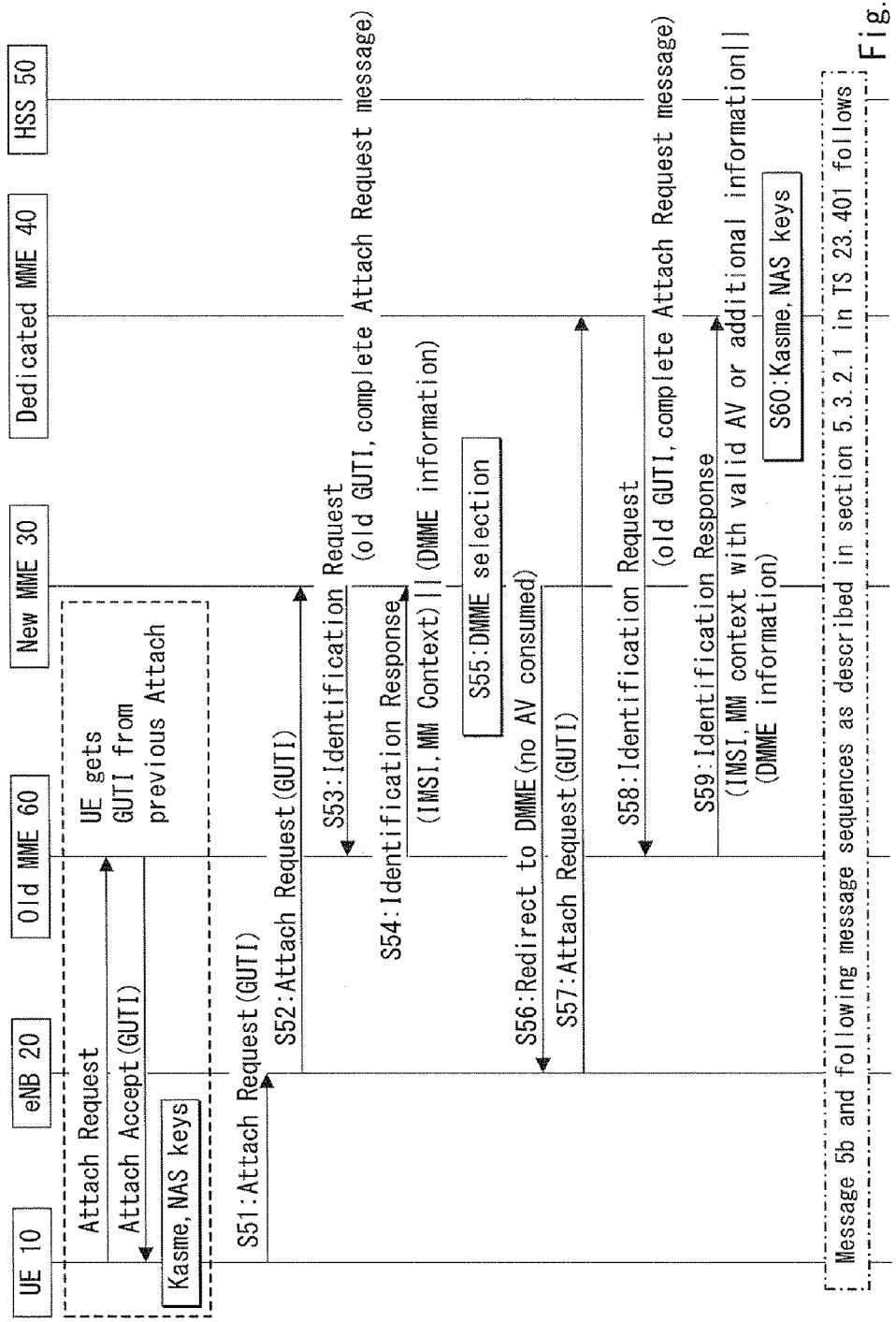
FIG. 6 is a sequence diagram showing a third example of operations in the network system according to the second exemplary embodiment.

FIG. 6 shows a sequence diagram for this option. Processes at steps S51 to S55 are performed in a similar manner to those at the above-mentioned steps S31 to S35 shown in FIG. 4.

Meanwhile, in this option, since the Old MME 60 served as the DMME for subscriber, the Old MME 60 maintains the security context for a while without removing it just till a second Identification Request message is received from a dedicated MME.

Upon the redirection, the New MME 30 sends a Redirect message to the eNB 20 (step S56). Then, the eNB 20 forwards the Attach Request message to the Dedicated MME 40 (step S57).

Upon receiving the Attach Request message, the Dedicated MME 40 sends to the Old MME 60 an Identification Request message including the GUTI and the complete Attach Request message (step S58).

Now, since the second Identification Request message is received, the Old MME 60 sends back to the Dedicated MME 40 an Identification Response message including the maintained MM Context (security context) (step S59).

Then, the Dedicated MME 40 extracts the Kasme and the NAS keys from the received MM context (step S60).

After that, a message 5b and the subsequent message sequences as disclosed in 3GPP TS 23.401, section 5.3.2.1 follows.

According to this option, like the typical GUTI attach procedure, the Dedicated MME 40 can retrieve necessary security context from the Old MME 60 by only using the GUTI, and thus needs not to start AKA procedure. Therefore, it is possible to drastically reduce signaling overload, as well as overload to the Dedicated MME for key computation. Moreover, since the Dedicated MME only has to contact the MME indicated by the GUTI, in other words, since the Dedicated MME only performs the existing message sequences, it is possible to minimize the impact on the Dedicated MME.

Further, it is preferable that the New MME 30 informs, through the Redirect message and the Attach Request message shown at the above-mentioned steps S56 and S57, the Dedicated MME 40 that no AV is consumed, and the Old MME 60 informs only valid AVs to the Dedicated MME 40 in the second Identification Response message shown at the above-mentioned step S59. This ensures that the Dedicated MME 40 can use the received AVs for conducting communication with the UE 10. Note that as a substitute for the valid AVs or in addition thereto, the Old MME 60 may inform other additional information to the Dedicated MME 40.

Furthermore, this option may be optimized such that the Old MME 60 remembers that integrity check for the Attach Request message is done at the above-mentioned step S53. In this case, the Dedicated MME 40 needs not to do the integrity check again at the above-mentioned step S57, and the Old MME 60 also needs not do the integrity check again at the above-mentioned step S58, so that it is possible to reduce the overload to the Dedicated MME 40 and the Old MME 60.

Note that although the exemplary embodiments have been described hereinbefore by taking as an example E-UTRAN, the present invention can also be applied to IMSI attach and P-TMSI (Packet-TMSI (Temporary Mobile Subscriber Identity)) attach in UTRAN. The mechanism is basically the same as for attach in E-UTRAN, except that e.g., the message is changed to carry Dedicated MME/SGSN information.

If the exemplary embodiments are referred to the UTRAN and GERAN (GSM (Global System for Mobile communications) EDGE (Enhanced Data GSM Environment) RAN), then the following replacements need to be made:
  replacing MME with SGSN;
  replacing DMME with DSGSN;
  replacing eNB with BTS (Base Transceiver Station)/BSC (Base Station Controller);
  replacing HSS with HLR (Home Location Register)/HSS; and
  replacing GUTI with P-TMSI.

Further, although the illustration is omitted, the New MME 30, the Dedicated MME 40 and the Old MME 60 each can be configured by, for example, one or more transceivers which conduct communication with the UE 10 through the eNB 20, which conduct communication between the MMEs 30, 40 and 60 through or not trough the eNB 20 and which conduct communication with the HSS 50, and a controller such as a CPU (Central Processing Unit) which controls these transceivers to execute the processes shown in the accompany sequence diagrams or processes equivalent thereto.

Note that the present invention is not limited to the above-mentioned exemplary embodiments, and it is obvious that various modifications can be made by those of ordinary skill in the art based on the recitation of the claims.

The whole or part of the exemplary embodiments disclosed above can be described as, but not limited to, the following supplementary notes.
(Supplementary Note 1)

A network system comprising:
  a first node that establishes secure connection with a UE (User Equipment) initially attempting to attach to a network, through a radio base station; and
  a second node to which the UE is redirected from the first node through the radio base station,
  wherein upon the redirection, the first node sends information on the first node itself to the second node through the radio base station, and
  wherein the second node uses the information to retrieve security context necessary for establishing the connection with the UE from the first node.
(Supplementary Note 2)

A method of control for a network system including a first node that establishes secure connection with a UE initially attempting to attach to a network, through a radio base station, and a second node to which the UE is redirected from the first node through the radio base station, the method comprising:
  sending, upon the redirection, information on the first node from the first node to the second node through the radio base station; and
  using, by the second node, the information to retrieve security context necessary for establishing the connection with the UE from the first node.
(Supplementary Note 3)

A network system comprising:
  a first node that receives an attach request from a UE initially attempting to attach to a network, through a radio base station; and
  a second node to which the attach request is redirected from the first node through the radio base station,
  wherein upon the reception of the attach request, the first node skips establishment of secure connection with the UE through the radio base station,
  wherein upon the redirection, the first node sends, to the second node through the radio base station, subscription information indicating that the UE is one to be redirected to the second node, and
  wherein in response to receiving the subscription information, the second node establishes the secure connection with the UE.
(Supplementary Note 4)

A method of control for a network system including a first node that receives an attach request from a UE initially attempting to attach to a network, through a radio base station, and a second node to which the attach request is redirected from the first node through the radio base station, the method comprising:
  skipping, by the first node upon the reception of the attach request, establishment of secure connection with the UE through the radio base station;
  sending, upon the redirection, from the first node to the second node through the radio base station, subscription information indicating that the UE is one to be redirected to the second node; and establishing, by the second node in response to receiving the subscription information, the secure connection with the UE.

(Supplementary Note 5)

A network system comprising:

a first node that established secure connection with a UE through a radio base station when the UE attached to a network previously, and that assigned a temporary identity to the UE;

a second node that receives an attach request including the temporary identity from the UE through the radio base station; and a third node to which the attach request is redirected from the second node through the radio base station, wherein the second node retrieves security context necessary for establishing the connection with the UE from the first node, and upon the redirection, sends information on the second node itself to the third node through the radio base station, and wherein the third node uses the information to retrieve the security context from the second node.

(Supplementary Note 6)

A method of control for a network system including a first node that established secure connection with a UE through a radio base station when the UE attached to a network previously and that assigned a temporary identity to the UE, a second node that receives an attach request including the temporary identity from the UE through the radio base station, and a third node to which the attach request is redirected from the second node through the radio base station, the method comprising:

retrieving, by the second node, security context necessary for establishing the connection with the UE from the first node;

sending, upon the redirection, information on the second node from the second node to the third node through the radio base station; and using, by the third node, the information to retrieve the security context from the second node.

(Supplementary Note 7)

A network system comprising:

a first node that established secure connection with a UE through a radio base station when the UE attached to a network previously, and that assigned a temporary identity to the UE;

a second node that receives an attach request including the temporary identity from the UE through the radio base station; and a third node to which the attach request is redirected from the second node through the radio base station, wherein the second node retrieves security context necessary for establishing the connection with the UE from the first node, and upon the redirection, sends the security context to the third node through the radio base station.

(Supplementary Note 8)

A method of control for a network system including a first node that established secure connection with a UE through a radio base station when the UE attached to a network previously and that assigned a temporary identity to the UE, a second node that receives an attach request including the temporary identity from the UE through the radio base station, and a third node to which the attach request is redirected from the second node through the radio base station, the method comprising:

retrieving, by the second node, security context necessary for establishing the connection with the UE from the first node; and sending, upon the redirection, the security context from the second node to the third node through the radio base station.

(Supplementary Note 9)

A network system comprising:

a first node that established secure connection with a UE through a radio base station when the UE attached to a network previously, and that assigned a temporary identity to the UE;

a second node that receives an attach request including the temporary identity from the UE through the radio base station; and a third node to which the attach request is redirected from the second node through the radio base station, wherein the first node maintains security context necessary for establishing the secure connection with the UE till an identification request is received from the third node, and wherein upon the redirection, the third node sends the identification request to the first node to retrieve the security context from the first node.

(Supplementary Note 10)

A method of control for a network system including a first node that established secure connection with a UE through a radio base station when the UE attached to a network previously and that assigned a temporary identity to the UE, a second node that receives an attach request including the temporary identity from the UE through the radio base station, and a third node to which the attach request is redirected from the second node through the radio base station, the method comprising:

maintaining, by the first node, security context necessary for establishing the secure connection with the UE till an identification request is received from the third node; and sending, by the third node upon the redirection, the identification request to the first node to retrieve the security context from the first node.

This application is based upon and claims the benefit of priority from Japanese patent application No. 2014-112269 filed on May 30, 2014, the disclosure of which is incorporated herein in its entirety by reference.

REFERENCE SIGNS LIST 10, 110 UE
20, 120 eNB
30, 40, 60, 130, 140, 160 MME
50, 150 HSS

The invention claimed is:

1. A core network node, comprising:
a first MME (Mobility Management Entity) or a first SGSN (Serving GPRS Support Node) that connects to a UE (User Equipment) via a base station; and
a second MME or a second SGSN that connects to the UE via the base station; wherein
the UE sends an attach request message to the first MME or the first SGSN via the base station,
the first MME or the first SGSN receives information related to a redirection and authentication vectors from a HSS (Home Subscriber Server) or a HLR (Home Location register)/HSS, and skips an authentication and security procedure with the UE,
the base station receives a redirect message including the information from the first MME or the first SGSN, and selects the second MME or the second SGSN, and
the second MME or the second SGSN performs the authentication and security procedure with the UE.

2. The core network node according to claim 1, wherein the second MME or the second SGSN is included in a Dedicated Core Network.

3. The core network node according to claim 1, wherein the first MME or the first SGSN preconfigures the information.

4. A communication method of a core network node including a first MME (Mobility Management Entity) or a first SGSN (Serving GPRS Support Node) that connects to a UE (User Equipment) via a base station, and a second MME or a second SGSN that connects to the UE via the base station, comprising:
  receiving, by the first MME or the first SGSN, an attach request message from the UE via the base station,
  receiving information related to a redirection and authentication vectors from a HSS (Home Subscriber Server) or a HLR (Home Location register)/HSS, and skipping an authentication and security procedure with the UE; and
  selecting, by the base station, the second MME or the second SGSN based on the base station receiving a redirect message including the information from the first MME or the SGSN; and
  performing, by the second MME or the second SGSN, the authentication and security procedure with the UE.

5. The method according to claim 4, wherein the second MME or the second SGSN is included in a Dedicated Core Network.

6. The method according to claim 4, wherein the first MME or the first SGSN preconfigures the information.

7. A base station for a mobile communication system including a UE (User Equipment), a first MME (Mobility Management Entity) or a first SGSN (Serving GPRS Support Node) which connects to the UE via the base station, and a second MME or a second SGSN which connects to the UE via the base station, comprising:
  a receiver configured to receive an attach request message from the UE, and receive a redirect message including information related to a redirection from the first MME or the first SGSN which receives the information and authentication vectors from a HSS (Home Subscriber Server) or a HLR (Home Location register)/HSS, and skips an authentication and security procedure with the UE, and
  a controller configured to select the second MME or the second SGSN; wherein
  the authentication and security procedure between the UE and the second MME or the second SGSN is performed.

8. The base station according to claim 7, wherein the second MME or the second SGSN is included in a Dedicated Core Network.

9. The base station according to claim 7, wherein the first MME or the first SGSN preconfigures the information.

10. A communication method of a base station for a mobile communication system including a UE (Use Equipment), a first MME (Mobility Management Entity) or a first SGSN (Serving GPRS Support Node) which connects to the UE via the base station, a second MME or a second SGSN which connects to the UE via the base station, comprising:
  receiving an attach request message from the UE;
  receiving a redirect message including information related to a redirection from the first MME or the first SGSN which receives the information and authentication vectors from a HSS (Home Subscriber Server) or a HLR (Home Location register)/HSS, and skips an authentication and security procedure with the UE;
  selecting the second MME or the second SGSN; and
  performing the authentication and security procedure between the UE and the second MME or the second SGSN.

11. The method according to claim 10, wherein the second MME or the second SGSN is included in a Dedicated Core Network.

12. The method according to claim 10, wherein the first MME or the first SGSN preconfigures the information.

13. A UE (User Equipment) for a mobile communication system including a base station, a first MME (Mobility Management Entity) or a first SGSN (Serving GPRS Support Node) which connects to the UE via the base station, and a second MME or a second SGSN which connects to the UE via the base station, comprising:
  a sender configured to send an attach request message to the first MME or the first SGSN that receives information related to a redirection and authentication vectors from a HSS (Home Subscriber Server) or a HLR (Home Location register)/HSS and skips an authentication and security procedure with the first MME or the first SGSN; and
  a controller configured to perform an authentication and security procedure with the second MME or the second SGSN that is selected by the base station which receives a redirection message including the information from the first MME or the first SGSN.

14. The mobile terminal according to claim 13, wherein the second MME or the second SGSN is included in a Dedicated Core Network.

15. The mobile terminal according to claim 13, wherein the first MME or the first SGSN preconfigures the information.

16. A communication method of a UE (User Equipment) for a mobile communication system including a base station, a first MME (Mobility Management Entity) or a first SGSN (Serving GPRS Support Node) which connects to the UE via the base station, and a second MME or a second SGSN which connects to the UE via the base station, comprising:
  sending an attach request message to the first MME or the first SGSN that receives information related to a redirection and authentication vectors from a HSS (Home Subscriber Server) or a HLR (Home Location register)/HSS and skips an authentication and security procedure with the first MME or the first SGSN; and
  performing the authentication and security procedure with the second MME or the second SGSN that is selected by the base station which receives a redirection message including the information from the first MME or the first SGSN.

17. The method according to claim 16, wherein the second MME or the second SGSN is included in a Dedicated Core Network.

18. The method according to claim 16, wherein the first MME or the first SGSN preconfigures the information.

* * * * *

UNITED STATES PATENT AND TRADEMARK OFFICE
CERTIFICATE OF CORRECTION

PATENT NO. : 10,104,603 B2
APPLICATION NO. : 15/314815
DATED : October 16, 2018
INVENTOR(S) : Xiaowei Zhang et al.

Page 1 of 1

It is certified that error appears in the above-identified patent and that said Letters Patent is hereby corrected as shown below:

In the Claims

At Column 16, Claim number 13, Line numbers 27 – 28 should read:
cation and security procedure with the UE; and At Column 16, Claim number 16, Line number 50 should read:
with the UE; and Signed and Sealed this
Nineteenth Day of May, 2020

Andrei Iancu
*Director of the United States Patent and Trademark Office*